Patented Dec. 13, 1927.

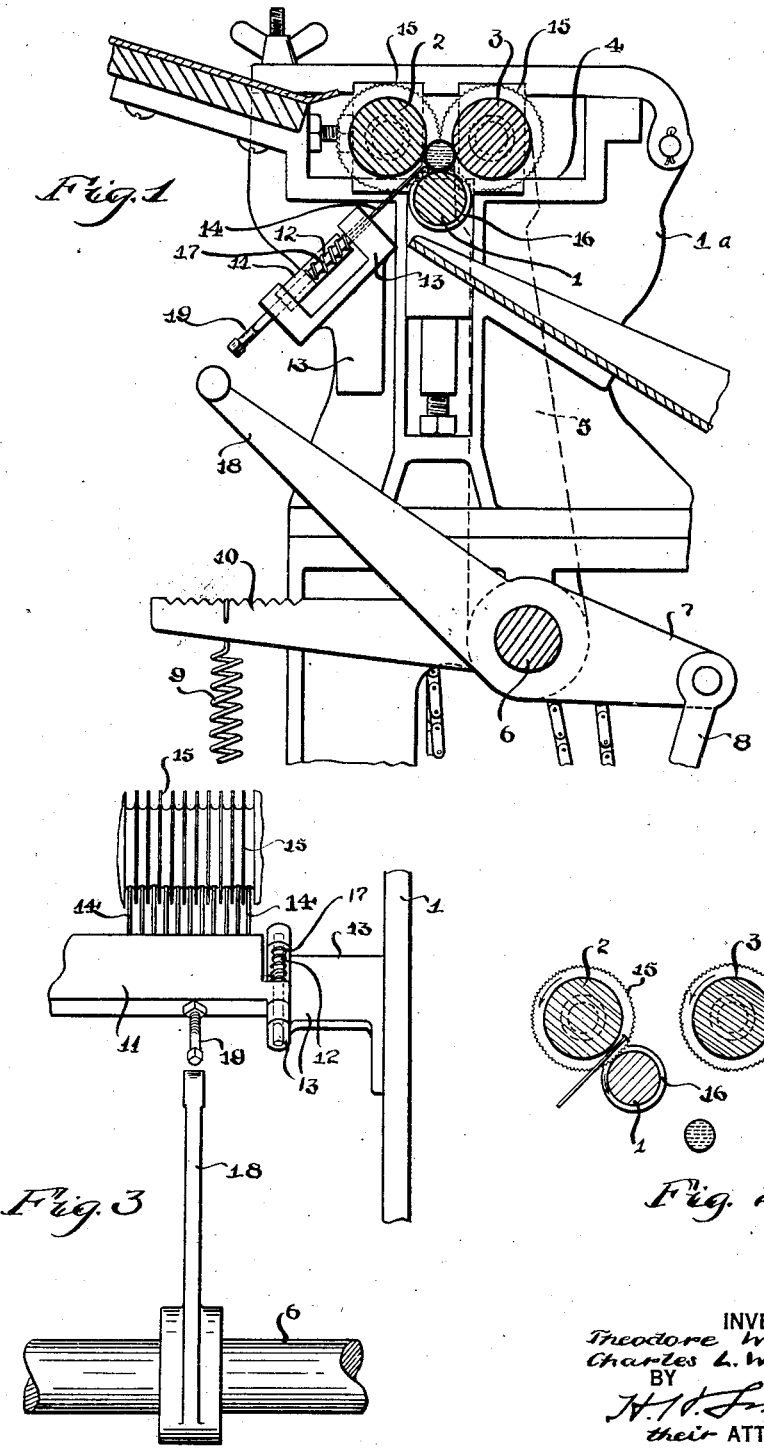

1,652,226

UNITED STATES PATENT OFFICE.

THEODORE WERNER AND CHARLES L. WERNER, OF ROCHESTER, NEW YORK, ASSIGNORS TO JOHN WERNER & SONS INC., OF ROCHESTER, NEW YORK, A CORPORATION OF NEW YORK.

CANDY-FORMING MACHINE.

Application filed April 9, 1927. Serial No. 182,335.

The present invention relates to candy forming machines and more particularly to the type in which the candy is formed between two forming rolls upon a supporting roll, one of the forming rolls being movable relatively to the other in order to permit the discharge of the candy between the movable forming roll and the supporting roll. An object of this invention is to provide in connection with a machine of the above mentioned type an ejecting mechanism which will positively insure the discharge of the candy between the movable forming and the supporting roll.

To these and other ends, the invention consists of certain parts and combinations of parts, all of which will be hereinafter described; the novel features being pointed out in the appended claims.

In the drawings:

Fig. 1 is a vertical section through a candy forming machine of the type illustrated in the patent to John Werner granted Nov. 28, 1916, No. 1,206,069, equipped with the present invention;

Fig. 2 is a detail view of the candy forming rolls and supporting roll operating on the candy and showing the directions of rotation of the roll; and Fig. 3 is a fragmentary view of the ejecting mechanism.

Referring to the illustrated emobodiment of the invention, 1ª indicates the side frames of the machine on which is rotatably mounted a supporting roll 1 and two candy forming rolls 2 and 3. In Fig. 2 is shown the direction of rotation of these rolls and they may be rotated in any suitable manner, a form of driving means being illustrated in the Werner patent hereinbefore mentioned. The candy forming roll 3 is supported to move in guides 4 and is moved on the guides by two arms 5 at opposite ends of the roll as in the Werner patent hereinbefore mentioned. These arms extend from a rock shaft 6 on which is arranged an arm 7 connected by a pitman 8 to a treadle not shown but illustrated in such Werner patent. A spring 9 connects with an arm 10 on the shaft 6 and holds the roller 3 with the yielding pressure toward the roller 2.

It has been found that while, in most instances, the candy will be ejected from the supporting roller 1 when the roller 3 is moved away from the roller as shown in Fig. 2. Nevertheless, in some instances, the candy maintains its position on the supporting roll. To overcome this objection an ejecting mechanism which will act positively on the candy to displace it from the supporting roll has been provided. This ejecting mechanism, in this instance, embodies a bar 11 having its ends guided on rods 12 supported by brackets 13 from the side frames 1 beneath the forming roll 2. This bar 11 carries a plurality of fingers 14 one for each piece of candy formed by the two candy forming rolls 2 and 3 at one operation, for it will be understood that each of the rolls 2 and 3 have annular cutting edges which coact to cut the separate candy pieces as in the before mentioned patent, whereas the lower roll 1 has grooves 16 in which these cutting edges operate. The fingers 14 of the ejector mechanism operate between the supporting roller 1 and the candy forming roller 2 in the spaces between the cutting edges 15 of said forming roller 2. Normally these fingers are held out of contact with the candy by springs 17 surrounding the guide rods 12 and abutting the brackets 13 and the bar 11. The end of the fingers are however in close proximity to the candy being formed so that only a slight movement of the fingers in the direction of their lengths is required to engage the candy and eject the same from the machine.

Movement of the fingers may be effected in any suitable manner, in this instance, the shaft 6 carries an additional arm 18 which is adapted to engage an adjustable abutment 19 on the bar 11 when the shaft is operated to move the roller 3 away from the roller 2 so that a common mechanism is provided which effects the separation of the roller 2 and 3 and also operates the ejector mechanism.

What we claim as our invention and desire to secure by Letters Patent is:

1. In a candy forming machine, the combination with a supporting roll and two candy forming rolls for cooperating with candy on the supporting roll, one of the candy forming rolls being movable relatively to the other to permit the discharge of the candy between it and the supporting roll, of ejecting means mounted to operate between the supporting roll and the other candy forming roll.

2. In a candy forming machine, the combination with a supporting roll and two candy forming rolls for cooperating with candy on the supporting roll, one of the candy forming rolls being movable relatively to the other to permit the discharge of the candy between it and the supporting roll, of ejecting means mounted to operate between the supporting roll and the other candy forming roll, and a common operating means for moving the movable candy forming roll and operating the ejecting means.

3. In a candy forming machine, the combination with a supporting roll and two candy forming rolls provided with annular cutting edges, one of said candy forming rolls being movable relatively to the other to permit the discharge of candy between it and the supporting roll, of ejecting means provided with a plurality of fingers operating between the supporting roll and the other candy forming roll in the spaces between the cutting edges of such other candy forming rolls.

4. In a candy forming machine, the combination with a supporting roll, and two candy forming rolls provided with annular cutting edges, one of said rolls being movable relatively to the other to permit the discharge of candy between it and the supporting roll, a shaft having means connecting it with the movable supporting roll to move the latter away from the other supporting roll, a bar guided on the frame and having a plurality of fingers projecting between the other candy forming roll and the supporting roll in the spaces between the cutting edges on such candy forming roll, spring means holding the fingers away from the candy, and an arm on the shaft for cooperating with the bar to move the fingers toward the candy.

THEODORE WERNER.
CHARLES L. WERNER.